(12) United States Patent
Puckett et al.

(10) Patent No.: US 12,305,988 B2
(45) Date of Patent: May 20, 2025

(54) TRANSVERSE MAGNETIC MODE TRAVELLING WAVE RESONATOR WITH AT LEAST ONE BRAGG GRATING AND GYROSCOPE APPLICATIONS THEREOF

(71) Applicant: Honeywell International Inc., Charlotte, NC (US)

(72) Inventors: Matthew Wade Puckett, Phoenix, AZ (US); Jianfeng Wu, Tucson, AZ (US); Steven Tin, Edina, MN (US); Tiequn Qiu, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 151 days.

(21) Appl. No.: 18/166,665

(22) Filed: Feb. 9, 2023

(65) Prior Publication Data
US 2024/0271936 A1 Aug. 15, 2024

(51) Int. Cl.
| | |
|---|---|
| *G01C 19/66* | (2006.01) |
| *G01C 19/72* | (2006.01) |
| *G02B 6/02* | (2006.01) |
| *G02B 6/12* | (2006.01) |
| *G02B 6/124* | (2006.01) |
| *G02B 6/293* | (2006.01) |

(52) U.S. Cl.
CPC ......... *G01C 19/661* (2013.01); *G01C 19/722* (2013.01); *G02B 6/02076* (2013.01); *G02B 6/12007* (2013.01); *G02B 6/124* (2013.01); *G02B 6/29341* (2013.01)

(58) Field of Classification Search
CPC .......... G01C 19/661; G01C 19/722; G02B 6/02076; G02B 6/12007; G02B 6/124; G02B 6/29341
See application file for complete search history.

(56) References Cited

U.S. PATENT DOCUMENTS

| | | | |
|---|---|---|---|
| 2004/0037503 A1 | 2/2004 | Hastings et al. | |
| 2008/0166095 A1* | 7/2008 | Popovic | G02B 6/107 385/15 |
| 2010/0209038 A1* | 8/2010 | Popovic | G02F 1/3133 385/27 |
| 2011/0013269 A1* | 1/2011 | Ogawa | G02B 6/122 359/341.1 |

(Continued)

FOREIGN PATENT DOCUMENTS

| | | |
|---|---|---|
| CN | 101952755 A | 1/2011 |
| EP | 3133691 A1 | 2/2017 |
| WO | 2013145271 A1 | 10/2013 |

OTHER PUBLICATIONS

Huang et al., "Improving the detection limit for on-chip photonic sensors based on subwavelength grating race track resonators", Optics Express, vol. 25, No. 9, May 1, 2017, pp. 10527 through 10535.

(Continued)

*Primary Examiner* — Michael A Lyons
(74) *Attorney, Agent, or Firm* — Fogg & Powers LLC

(57) ABSTRACT

Techniques are provided for implementing and using a high quality factor travelling wave resonator configured to propagate a transverse magnetic mode optical signals and suppress transverse electric mode optical signals. The travelling wave resonator may be used in a resonator optical gyroscope.

14 Claims, 4 Drawing Sheets

(56) References Cited

U.S. PATENT DOCUMENTS

2023/0384519 A1* 11/2023 Huang ................ G02B 6/1228
2024/0271937 A1*  8/2024 Wu .................... G01C 19/722

OTHER PUBLICATIONS

Jiang et al., "High-sensitivity Silicon-on-insulator Double-ring Sensor Operating in Transvers-magnetic Mode", 2013 Conference on Lasers and Electro-Optics Pacific Rim (CLEO-PR), Jun. 30-Jul. 4, 2013, Kyoto, Japan, Paper TuPM-14, Optica Publishing Group 2013, pp. 1 through 2.

European Patent Office, "Extended European Search Report", dated May 28, 2024, from U.S. Appl. No. 18/166,665, from Foreign Counterpart to U.S. Appl. No. 18/166,665, pp. 1 through 9, Published: EP.

Schmidt et al., "Improving the performance of silicon photonic rings, disks, and Bragg gratings for use in label-free biosensing", Proceedings of SPIE, IEEE, US, vol. 9166, No. 27, Aug. 27, 2014, pp. 91660M-1 through -91660M-38.

\* cited by examiner

TRANSVERSE MAGNETIC MODE TRAVELLING WAVE RESONATOR WITH AT LEAST ONE BRAGG GRATING AND GYROSCOPE APPLICATIONS THEREOF

STATEMENT REGARDING FEDERALLY SPONSORED RESEARCH OR DEVELOPMENT

This invention was made with Government support under Contract No. 2134830-635857 awarded by the National Science Foundation. The Government has certain rights in the invention.

BACKGROUND

Conventional planar optical waveguides support many different modes depending on the waveguide design. Among all those modes, a transverse electric (TE) mode, e.g., TE0 mode, has the highest effective index and is the fundamental mode. Corresponding loss of the conventional planar optical waveguide supporting the TE0 mode is about 0.05 dB/m.

The loss of the conventional planar optical waveguide supporting a TE mode affects a quality, or Q, factor and finesse value of a resonator made with the conventional planar optical waveguide. A higher loss results in a lower Q factor and finesse value which is undesirable.

SUMMARY

A resonator configured to be mounted over a surface of a substrate is provided. The resonator comprises: planar optical waveguide comprising: a core having a core index of refraction and a thickness which is at least ten percent of a free space wavelength of an optical signal configured to be propagated by such planar optical waveguide, wherein the thickness means a dimension along an axis perpendicular to the surface, of the substrate, under the resonator; and cladding having a cladding index of refraction and surrounding the core and over the surface of the substrate; wherein the cladding index of refraction is smaller than the cladding index of refraction; at least one sidewall of the cladding, wherein a sidewall means a surface, of the cladding, perpendicular to the surface of the substrate; and at least one Bragg grating, wherein each Bragg grating is in a unique sidewall of the cladding; wherein a period of each Bragg grating period is greater than the free space wavelength of the optical signal configured to propagate in the planar optical waveguide divided by two times an index of refraction of a transverse electric (TE) mode; wherein the period of a Bragg grating is less than the free space wavelength of the optical signal configured to propagate in the planar optical waveguide divided by two times an index of refraction of a transverse magnetic (TM) mode; wherein the resonator is a travelling wave resonator configured to propagate electromagnetic energy in only one direction.

DRAWINGS

Understanding that the drawings depict only exemplary embodiments and are not therefore to be considered limiting in scope, the exemplary embodiments will be described with additional specificity and detail through the use of the accompanying drawings, in which.

Figure 3:
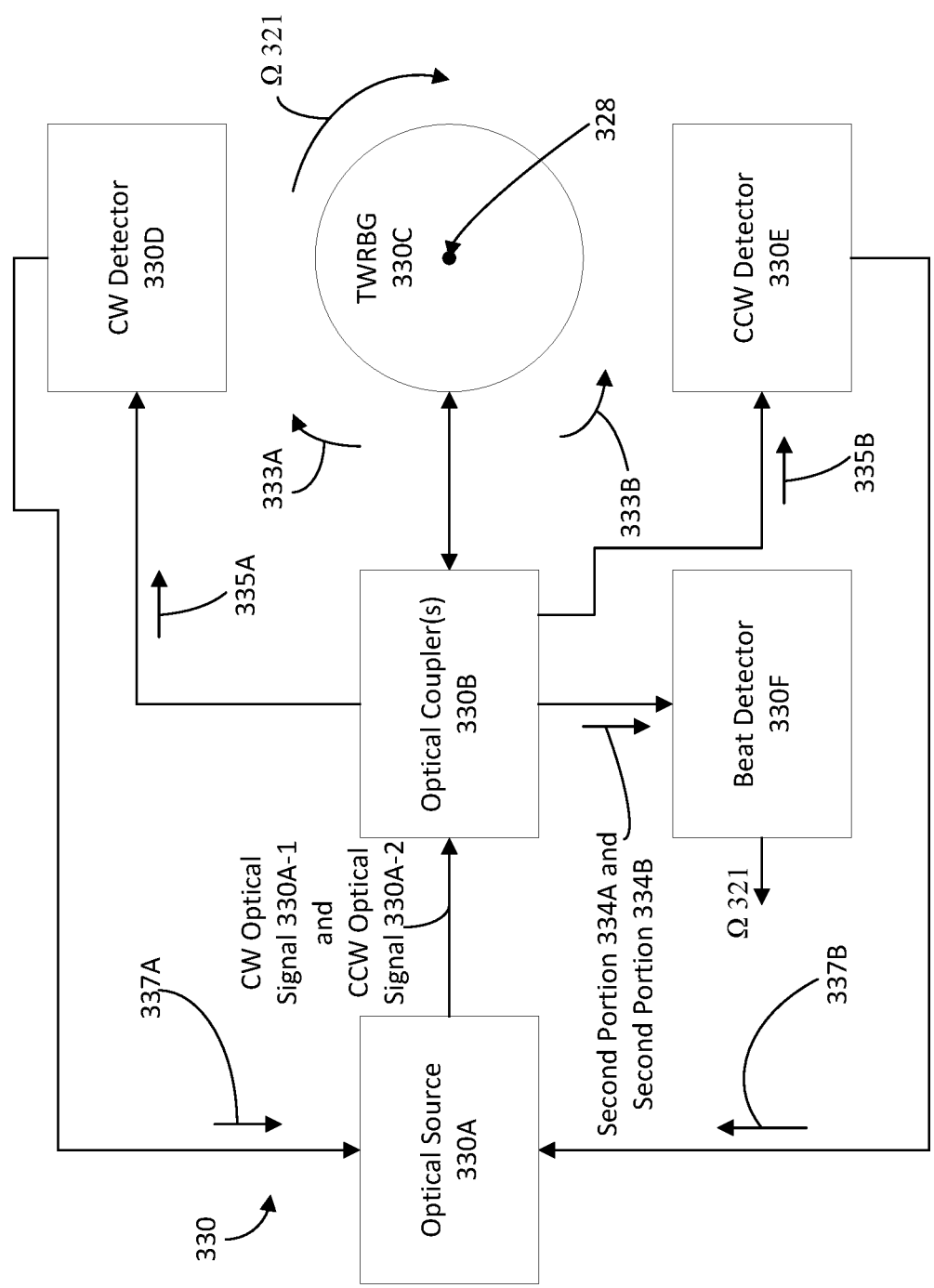
Figure 4:
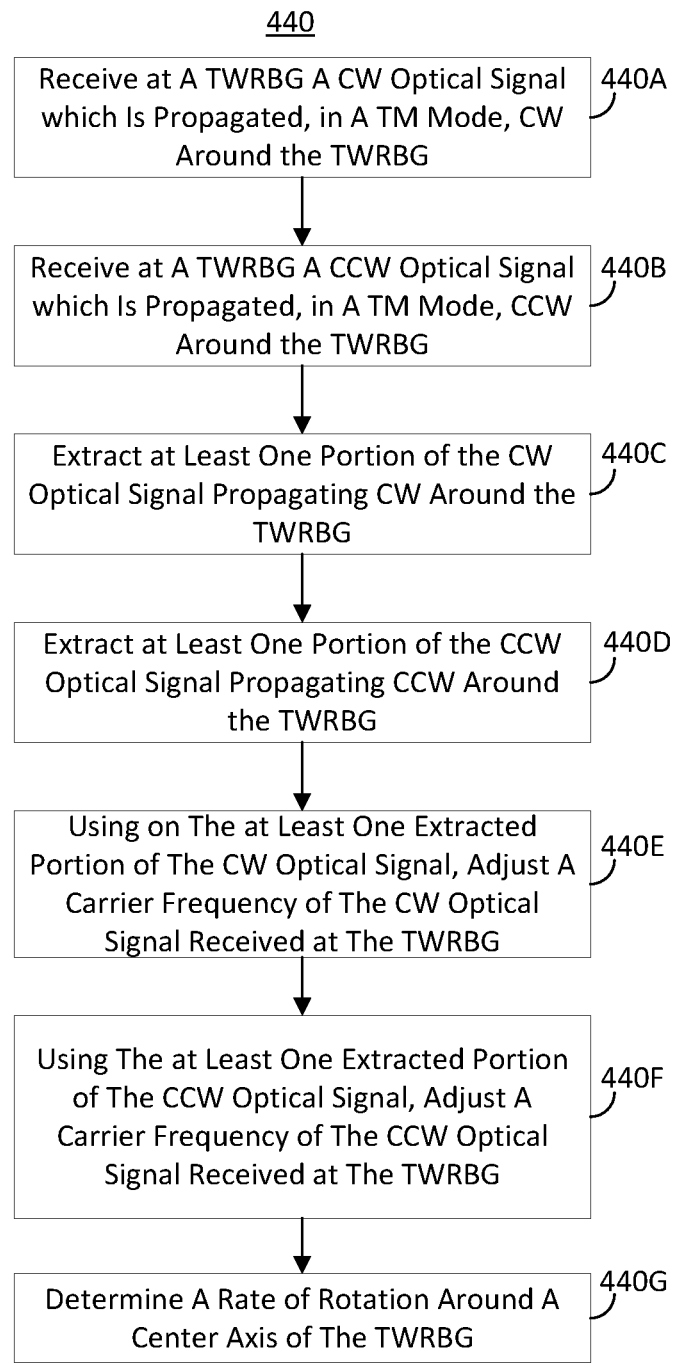

FIG. 3 illustrates a block diagram of one embodiment of a resonator optical gyroscope comprising a travelling wave resonator including TMWG and a Bragg grating in at least one sidewall; and FIG. 4 illustrates a flow diagram of one embodiment of a method of an operation of a resonator optical gyroscope comprising travelling wave resonator formed with a planar optical waveguide configured to support a transverse magnetic mode and with Bragg gratings in at least one sidewall of the travelling wave resonator.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A travelling wave resonator made with planar optical waveguide which supports a transverse magnetic (TM), e.g., TM0, mode is provided. A travelling wave resonator means a resonator in which electromagnetic energy propagates in only one direction, e.g., clockwise or counterclockwise around the travelling wave resonator. Types of travelling wave resonators include disc, ring, and racetrack resonators. The travelling wave resonator made with planar optical waveguide which supports at least, e.g., only, one, transverse magnetic (TM), e.g., TM0, mode of an optical signal (e.g., in a resonator optical gyroscope).

The planar optical waveguide which supports a TM mode includes a core having a thickness which is at least ten percent of the free space wavelength of the optical signal configured to be propagated by such planar optical waveguide. Corresponding loss of such planar optical waveguide supporting the TM0 mode is about 0.01 dB/m. Because the loss of such planar optical waveguide is significantly diminished, the Q factor and finesse value of a resonator made with such planar optical waveguide is significantly enhanced.

Thickness means a dimension along an axis substantially perpendicular (or orthogonal) to a substrate upon which the travelling wave resonator (or planar optical waveguide) is formed. Width means a dimension along another axis substantially perpendicular to the axis of thickness and parallel with a surface of the substrate which supports the travelling wave resonator (or planar optical waveguide). When a resonator is formed with the planar optical waveguide, the width is a dimension of the resonator; optionally, the width is a diameter of a ring resonator or a disc resonator.

The travelling wave resonator, including planar optical waveguide which supports a TM mode, includes a Bragg grating on at least one core sidewall of the core of the planar optical waveguide. The Bragg grating suppresses propagation of TE mode(s) in such planar optical waveguide by radiating the electromagnetic energy of the TE mode(s), but not radiating the electromagnetic energy of the TM mode(s). A core sidewall means a surface, of the core of the planar optical waveguide, which is substantially perpendicular to the substrate upon which the travelling wave resonator is formed. For example, a disc resonator only has one sidewall, where as a ring resonator and a racetrack resonator each have two sidewalls.

The travelling wave resonator, which includes planar optical waveguide which supports a TM mode and a Bragg grating on at least one sidewall of the core of the planar optical waveguide, may be used in a resonator optical gyroscope. Because such the travelling wave resonator has a higher Q factor and a higher finesse value, the gyroscope can detect smaller changes in rotation rate of the travelling wave resonator, i.e., provide a lower angle random walk.

Figure 1:
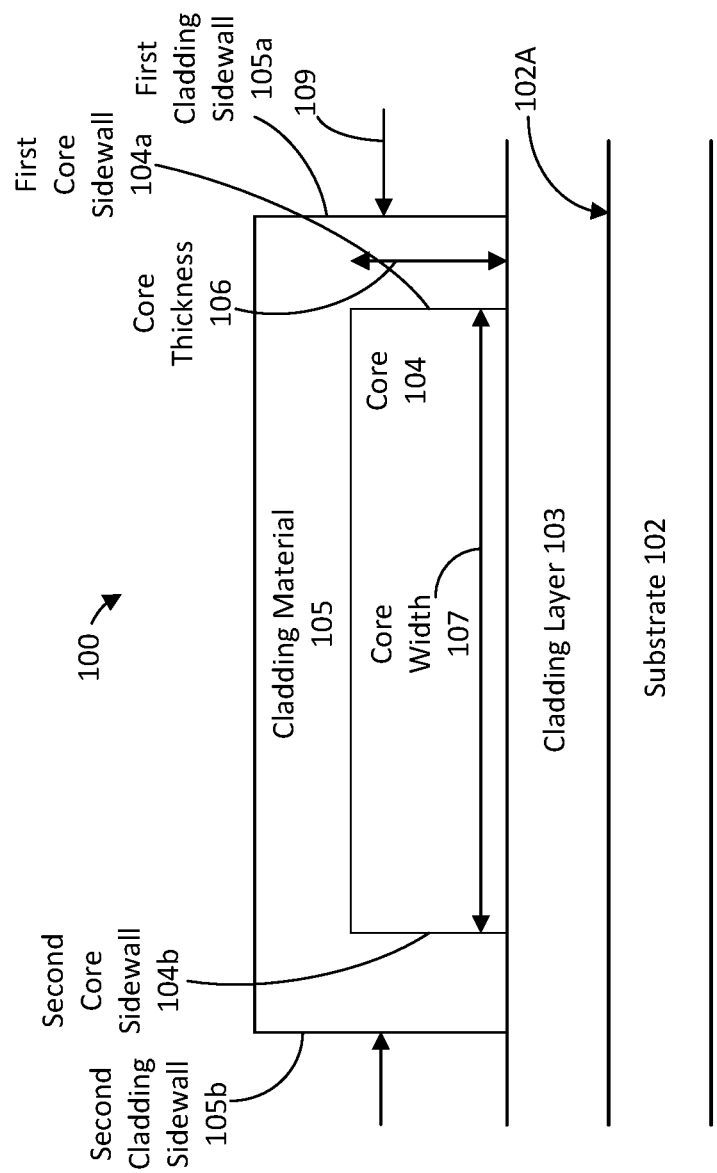
FIG. 1 illustrates a cross section of one embodiment a planar optical waveguide configured to support a TM mode (TMWG)

FIG. 1 illustrates a cross section of one embodiment of a planar optical waveguide configured to support a TM, e.g., TM0, mode (or TMWG) 100. The TMWG 100 includes a core 104, cladding material 105, and a cladding layer 103. The TMWG 100 is formed on a substrate 102, e.g., over a surface 102A of the substrate. The cladding layer 103 is deposited or formed on (or over) the substrate 102 which mechanically supports the TMWG 100. Optionally, the substrate 102 for example an insulator for example undoped silicon or glass.

The core 104 is formed on (or over) the cladding layer 103. The core 104 has a core thickness (or core height) 106 and a core width 107. The core 104 also has a first core sidewall 104a and a second core side wall 104b which are each substantially orthogonal to the substrate 102. Optionally, the core 104 comprises silicon nitride; however, other materials can be used to form the core 104.

The cladding material 105 is deposited or formed on (or over) the core 104, and on (or over) the cladding layer 103. The cladding material 105 also has a first cladding sidewall 105a and a second cladding sidewall 105b which are each substantially orthogonal to the substrate 102.

The cladding material 105 and the cladding layer 103 may be jointly referred to as cladding. Optionally, each of the cladding material 105 and the cladding layer 103 include silicon dioxide; however, other material(s) can be used to form each of the cladding material 105 and/or the cladding layer 103. The index of refraction of the cladding must be lower than the index of refraction of the core 104 to permit optical signals to be substantially confined within the TMWG 100, e.g., within the cladding; an optical signal propagating in the TMWG 100 is configured to be substantially confined within the cladding.

The TMWG 100 has a width 109 which is a distance between a first cladding sidewall 105a and a second cladding sidewall 105b. Optionally, to suppress TM modes higher than the TM0 mode, the core width 107 is less than seven free space wavelengths of the optical signal configured to be propagated in the TMWG 100.

Embodiments of the invention may be a travelling wave resonator formed with TMWG 100 and Bragg gratings in at least one sidewall 104a, 104b of the core 104 of the TWMG 100 (collectively "TWRBG"). Examples of such TWRBG are a disc resonator formed with TMWG 100 and a Bragg grating in a sidewall 104a, 104b of the core 104 of the TMWG 100, a ring resonator formed with TMWG 100 and a Bragg grating in one or both sidewalls of the core 104 of the TMWG 100, or a racetrack resonator formed with TMWG 100 and a Bragg grating in one or both sidewalls of a core 104 of the TMWG 100. A racetrack resonator includes two halves of a ring resonator joined by two substantially straight portions TMWG 100.

The Bragg gratings in sidewall(s) of the core of a TWMG 100 suppresses TE modes, including the TE0 mode, by creating optical loss for TE modes. Firstly, the Bragg grating period is greater than a free space wavelength of an optical signal configured to propagate in the travelling wave resonator (or the planar optical waveguide thereof) divided by two times an index of refraction of the TE, e.g., the TE0, mode. This causes electromagnetic energy of the TE mode(s) to be radiated (i.e., reflected in mode(s) that are lossy) by the Bragg grating in the sidewall(s) of the core. Secondly, the Bragg grating period is also less than the free space wavelength of the optical signal configured to propagate in the travelling wave resonator (or the planar optical waveguide thereof) divided by two times an index of refraction of the TM, e.g., the TM0, mode. This prevents the electromagnetic energy of the TM mode(s) from being radiated (i.e., not reflected in mode(s) that are lossy) by the Bragg grating in the sidewall(s) of the core; thus, the Bragg grating allows the TM mode(s) to propagate in the planar optical waveguide of the travelling wave resonator. The Bragg grating depth is selected to provide a sufficient attenuation, e.g., greater than or equal to 60 decibels (dB), of the TE mode(s). The Bragg grating depth is proportional to a level of attenuation of the TE mode(s).

Figure 2B:
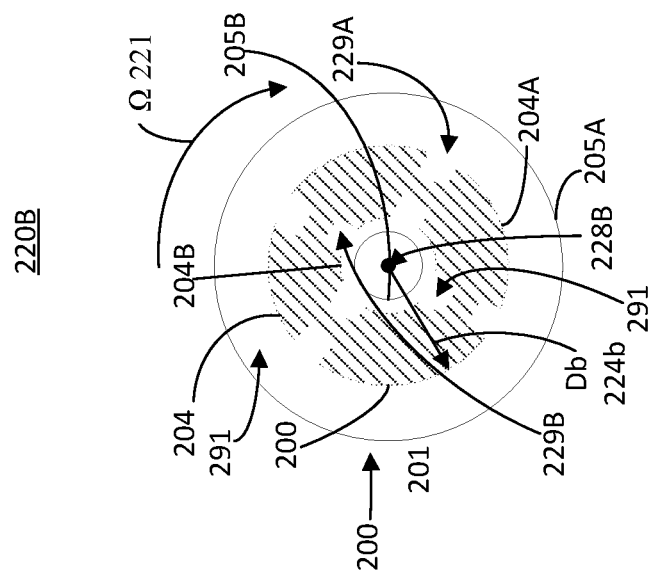
FIG. 2B illustrates a plan view of one embodiment of a ring resonator formed with TMWG and a first Bragg grating in a first sidewall and/or a second Bragg grating in a second sidewall.
Figure 2A:
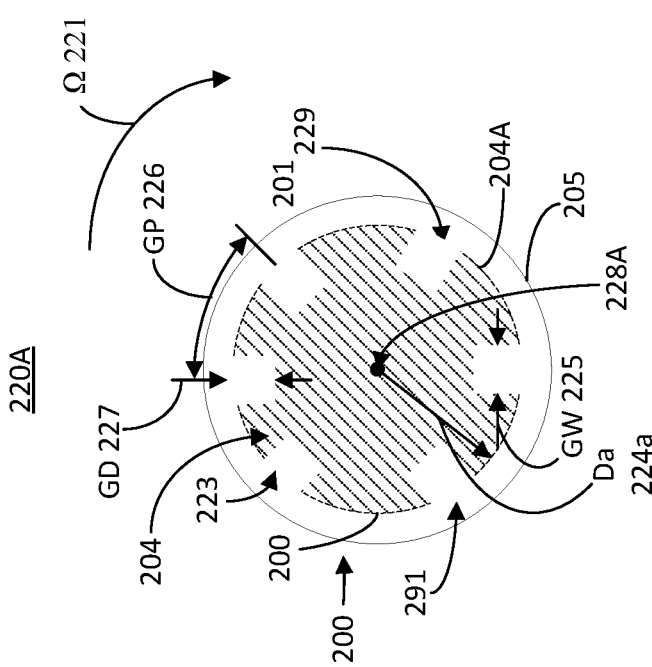
FIG. 2A illustrates a plan view of one embodiment of a disc resonator formed with TMWG and a Bragg grating in a sidewall of the disc resonator.

FIG. 2A illustrates a plan view of one embodiment of a disc resonator formed with TMWG 100 and a Bragg grating 229 in an exterior core sidewall 204A of the core 204 of the TMWG 100 (collectively DRTMWG 220A). The DRTMWG 220A has an exterior surface 205 which is an exterior surface of cladding. The core 204 is covered by cladding 291. The DRTMWG 220A comprises TMWG 200 formed with a cross-sectional shape of a disc over a substrate 201. The Bragg grating 229 includes more than one grating elements 223 in the exterior core sidewall 204A. Each grating element 223 may have sides that are substantially perpendicular or curved, e.g., scalloped. For pedagogical purposes, the Bragg grating elements 223 illustrated in FIGS. 2A and 2B are illustrated to have sides which are substantially perpendicular. Optionally, each grating element 223 has a grating depth (GD) 227 and a grating width (GW) 225. For the embodiments described herein, each Bragg grating 229 in a sidewall (of the core of the TMWG 100) has a Bragg grating period (GP) 226. For purposes of clarity, the Bragg grating period 226 between each Bragg grating element is substantially equal. The DRTMWG 220A also includes a center axis (or rotation axis) 228A around which a gyroscope (including the DRTMWG 220A) may be rotated at a rate of rotation ($\Omega$) 221. The core 204 has a diameter Da 224a (from the center axis 228A to the exterior core sidewall 204A).

FIG. 2B illustrates a plan view of one embodiment of a ring resonator formed with TMWG 100 and a first Bragg grating 229A in an exterior core sidewall 204A of the core 204 and/or a second Bragg grating 229B in an interior core sidewall 204B of the core 204 (collectively RTMWG 220B). Cladding 291 has an exterior cladding sidewall 205A and an interior cladding sidewall 205B. The core 204 has a diameter Db 224b (from a center axis (or rotation axis) 228B to the exterior core sidewall 205A). For pedagogical purposes, FIG. 2B illustrates a first Bragg grating 229A in the exterior core sidewall 204A and a second Bragg grating 229B in the interior core sidewall 204B. Each of the first and the second Bragg gratings 229A, 229B may be implemented as described elsewhere herein. The RTMWG 220B also includes the center axis 228B around which a gyroscope may be rotated at a rate of rotation (Ω) 221. The RTMWG 220B has an outer diameter Db 224b (from the center axis 228B to the exterior cladding sidewall 204A).

A racetrack resonator formed with TMWG 100 includes a first Bragg grating in a first core sidewall and/or a second Bragg grating in a second core sidewall. The racetrack resonator formed with TMWG 100 and including the first Bragg grating in the first core sidewall and/or the second Bragg grating in the second core sidewall also includes a center axis around which such racetrack resonator may be rotated at a rate of rotation (Ω). The mode of the optical signal is weakly or strongly confined to the cores of the resonators, e.g., illustrated in FIGS. 2A and 2B.

FIG. 3 illustrates a block diagram of one embodiment of a resonator optical gyroscope 330 comprising a travelling wave resonator including TMWG and a Bragg grating in at least one sidewall of the travelling wave resonator. The TWRBG 330C includes a center axis (or rotation axis) 328 around which the resonator optical gyroscope 330 may rotate. Optionally, the TWRBG 330C may be implemented using the techniques described elsewhere herein, e.g., with respect to one or more of FIGS. 1, 2A, and 2B.

The resonator optical gyroscope 330 also includes an optical source 330A, at least one optical coupler (optical coupler(s)) 330B, a clockwise optical signal detector (CW detector or CW detector circuit) 330D, a counterclockwise optical signal detector (CCW detector or CCW detector circuit) 330E, and a beat detector (or beat detector circuit) 330F. Optionally, the beat detector may be implemented with optical, analog, and/or digital electronic circuitry. Optionally, the optical source 330A includes one or more lasers. The optical source 330A is configured to generate a clockwise (CW) optical signal 330A-1 and a counterclockwise (CCW) optical signal 330A-2. The optical source 330A is optically coupled to the optical coupler(s) 330B.

The optical coupler(s) 330B are also optically coupled to each of the TWRBG 330C, the CW detector 330D, the CCW detector 330E, and the beat detector 330F. The optical coupler(s) 330B are configured to optically couple the CW optical signal 330A-1, received from the optical source 330A, into the TWRBG 330C so that a portion 333A (of the CW optical signal 330A-1) circulates around the TWRBG 330C in a CW direction. The optical coupler(s) 330B are further configured to optically couple the CCW optical signal 330A-2, received from the optical source 330A, into the TWRBG 330C so that a portion 333B (of the CCW optical signal 330A-2) circulates around the TWRBG 330C in a CCW direction. Optionally, each optical coupler includes, e.g., is formed by, a planar optical waveguide, e.g., configured to support a TM mode (for example TM0 mode), having a portion whose core is adjacent to a core of the TWRBG 330C.

The optical coupler(s) 330B are also configured to optically couple, a first portion 335A of the portion 333A (of the CW optical signal 330A-1) circulating around the TWRBG 330C in the CW direction, to the CW detector 330D. Optionally, each of the CW detector 330D and the CCW detector 330E may be a detector, e.g., a photodiode, configured to determine incident optical power level. Each of the CW detector 330D and the CCW detector 330E is coupled to the optical source 330A. The CW detector 330D provides a CW control signal 337A to the optical source 330A indicative of a power level of the first portion 335A.

The optical coupler(s) 330B are also configured to optically couple, a first portion 335A of the portion 333A (of the CW optical signal 330A-1) circulating around the TWRBG 330C in the CW direction, to the CW detector 330D. The optical coupler(s) 330B are also configured to optically couple, a first portion 335B of the portion 333B (of the CCW optical signal 330A-2) circulating around the TWRBG 330C in the CCW direction, to the CCW detector 330E. The CCW detector 330E provides a CCW control signal 337B to the optical source 330A indicative of a power level of the first portion 335A. When the resonator optical gyroscope 330 is rotated around its center axis 328, the resonant frequencies in each of the CW and CCW directions are separated (or become different) due to the Sagnac effect. The optical source 330A is configured to use the CW control signal 337A to adjust a carrier frequency of the CW optical signal 330A-1 to be equal to the resonant frequency of TWRBG 330C in the CW direction including accounting for changes in the resonant frequency due to a rotation rate (Ω) 321 around the center axis 328. The optical source 330A is configured to use the CCW control signal 337B to adjust a carrier frequency of the CCW optical signal 330A-2 to be equal to the resonant frequency of TWRBG 330C in the CCW direction including accounting for changes in the resonant frequency due to the rotation rate 321 around the center axis 328.

The optical coupler(s) 330B are also configured to optically couple, to the beat detector 330F, a second portion 334A of the portion 333A (of the CW optical signal 330A-1) circulating CW around the TWRBG 330C and a second portion 334B of the portion 333B (of the CCW optical signals 333A-2) circulating CCW around the TWRBG 330C. The beat detector 330F is configured to determine a rate of rotation 321 around the center axis 328 of the TWRBG 330C. The rate of rotation 321 is a function of a difference (or beat), Δf, of a carrier frequency of the second portion 334A of the portion 333A (of the CW optical signal 330A-1) circulating CW around the TWRBG 330C and a carrier frequency of the second portion 334B of the portion 333B (of the CCW optical signal 330A-2) circulating CCW around the TWRBG 330C. Optionally, for a ring or a disc resonator, the rate of rotation 321 may also be a function of dimensions of the TWRBG 330C, e.g., a diameter, e.g., the core diameter D 224a, 224b, of the TWRBG, an average wavelength, λ, of the CW optical signal 330A-1 and the CCW optical signal 330A-2, and a refractive index, n, of the TWRBG 330C, e.g., of the cladding in the TWRBG 330C. For each of the DRTMWG 220A and the RTMWG 220B, the rate of rotation 321 around the rotation axis 328 of the TWRBG 330C is:

$$\Omega = (\Delta f * n * \lambda)/D$$

Equations for other travelling wave resonators, e.g., a racetrack resonator, may differ.

FIG. 4 illustrates a flow diagram of one embodiment of a method 440 of operation of a resonator optical gyroscope comprising travelling wave resonator formed with a planar optical waveguide configured to support a TM, e.g., TM0, mode and Bragg gratings in one or two sidewalls of the travelling wave resonator. To the extent that the methods shown in any Figures are described herein as being implemented with any of the systems illustrated herein, it is to be understood that other embodiments can be implemented in other ways. Optionally, method 440 may be implemented by a TWRBG and a gyroscope described elsewhere herein, e.g., with respect to one or more of FIGS. 1, 2A, 2B, and 3. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440A, a CW optical signal is received at a TWRBG and propagated, e.g., in a TM mode (for example a TM0 mode), clockwise around the TWRBG. Optionally, the TWRBG may be implemented as described elsewhere herein. In block 440B, a CCW optical signal is received at a TWRBG and propagated, e.g., in a TM mode (for example a TM0 mode), counterclockwise around the TWRBG.

In block 440C, at least one portion of the CW optical signal propagating clockwise around the TWRBG is extracted from the TWRBG. Optionally, the at least portion of the CW optical signal propagating clockwise around the TWRBG includes a first extracted portion and a second extracted portion of the CW optical signal propagating around the TWRBG.

In block 440D, at least one portion of the CCW optical signal propagating counterclockwise around the TWRBG is extracted from the TWRBG. Optionally, the at least portion of the CCW optical signal propagating clockwise around the TWRBG includes a first extracted portion and a second extracted portion of the CCW optical signal propagating around the TWRBG.

In block 440E, using the at least one extracted portion of the CW optical signal, a carrier frequency of the CW optical signal, received at the TWRBG, is adjusted to equal a CW resonant frequency of the TWRBG. Optionally, the first extracted portion of the CW optical signal propagating clockwise around the TWRBG is used to adjust the carrier frequency of the CW optical signal, received at the TWRBG, to equal the CW resonant frequency of the TWRBG.

In block 440F, using the at least one extracted portion of the CCW optical signal, a carrier frequency of the CCW optical signal, received at the TWRBG, is adjusted to equal a CCW resonant frequency of the TWRBG. Optionally, the first extracted portion of the CCW optical signal propagating clockwise around the TWRBG is used to adjust the carrier frequency of the CCW optical signal, received at the TWRBG, to equal the CCW resonant frequency of the TWRBG.

In block 440G, using a carrier frequency of the at least one extracted portion of the CW optical signal and a carrier frequency of the at least one extracted portion of the CCW optical signal, a rate of rotation of the resonant optical gyroscope around a center axis of the TWRBG is determined. Optionally, the rate of rotation around the TWRBG may be implemented as described elsewhere herein. Optionally, the carrier frequency of the second extracted portion of the CW optical signal and the carrier frequency of the second extracted portion of the CCW optical signal are used to determine the rate of rotation of the resonant optical gyroscope around a center axis of the TWRBG.

Terms of relative position as used in this application are defined based on a plane parallel to, or in the case of the term coplanar—the same plane as, the conventional plane or working surface of a layer, wafer, or substrate, regardless of orientation. The term "horizontal" or "lateral" as used in this application are defined as a plane parallel to the conventional plane or working surface of a layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer, wafer, or substrate, regardless of orientation. The term "coplanar" as used in this application is defined as a plane in the same plane as the conventional plane or working surface of a layer, wafer, or substrate, regardless of orientation.

Exemplary Embodiments

Example 1 includes a resonator configured to be mounted over a surface of a substrate, comprising: planar optical waveguide comprising: a core having a core index of refraction and a thickness which is at least ten percent of a free space wavelength of an optical signal configured to be propagated by such planar optical waveguide, wherein the thickness means a dimension along an axis perpendicular to the surface, of the substrate, under the resonator; and cladding having a cladding index of refraction and surrounding the core and over the surface of the substrate; wherein the cladding index of refraction is smaller than the core index of refraction; at least one sidewall of the cladding, wherein a sidewall means a surface, of the cladding, perpendicular to the surface of the substrate; and at least one Bragg grating, wherein each Bragg grating is in a unique sidewall of the cladding; wherein a period of each Bragg grating period is greater than the free space wavelength of the optical signal configured to propagate in the planar optical waveguide divided by two times an index of refraction of a transverse electric (TE) mode; wherein the period of a Bragg grating is less than the free space wavelength of the optical signal configured to propagate in the planar optical waveguide divided by two times an index of refraction of a transverse magnetic (TM) mode; wherein the resonator is a travelling wave resonator configured to propagate electromagnetic energy in only one direction.

Example 2 includes the resonator of Example 1, wherein the TM mode is a TM0 mode.

Example 3 includes the resonator of any of Examples 1-2, wherein the TE mode is a TE0 mode.

Example 4 includes the resonator of any of Examples 1-3, wherein the core comprises silicon nitride and the cladding comprises silicon dioxide.

Example 5 includes the resonator of any of Examples 1-4, wherein travelling wave resonator is one of a ring resonator, a disc resonator, and a racetrack resonator.

Example 6 includes the resonator of any of Examples 1-5, wherein the core has a width that is less than seven free space wavelengths of the optical signal configured to be propagated in the planar optical waveguide, wherein the width means a dimension along another axis substantially perpendicular to the axis of the thickness and parallel with a surface of the substrate.

Example 7 includes the resonator of Example 6, wherein the width is a diameter of the core when the resonator is a disc resonator.

Example 8 includes a resonator optical gyroscope, comprising: a travelling wave resonator configured to be mounted over a surface of a substrate, wherein the travelling wave resonator is configured to propagate electromagnetic energy in only one direction; the travelling wave resonator comprising: planar optical waveguide comprising: a core having a core index of refraction and a thickness which is at least ten percent of a free space wavelength of an optical signal configured to be propagated in such planar optical waveguide, wherein the thickness means a dimension along an axis perpendicular to the surface of the substrate; and cladding having a cladding index of refraction and surrounding the core and over the surface of the substrate; wherein the cladding index of refraction is smaller than the core index of refraction; at least one sidewall of the cladding, wherein a sidewall means a surface, of the cladding, perpendicular to the surface of the substrate; at least one Bragg grating, wherein each Bragg grating is in a unique sidewall of the cladding; and a rotation axis around which the resonator optical gyroscope is configured to be rotated; wherein a period of each Bragg grating period is greater than the free space wavelength of the optical signal configured to propagate in the planar optical waveguide divided by two times an index of refraction of a transverse electric (TE) mode; wherein the period of a Bragg grating is less than the free space wavelength of the optical signal configured to propagate in the planar optical waveguide divided by two times an index of refraction of a transverse magnetic (TM) mode; an optical source, comprising at least one laser, configured to emit a clockwise (CW) optical signal and a counterclockwise (CCW) optical signal; at least one optical coupler configured to (a) optically couple, to the travelling wave resonator, (i) a portion of the CW optical signal configured to propagate CW around the travelling wave resonator and (ii) a portion of the CCW optical signal configured to propagate CW around the travelling wave resonator, (b) optically couple, (p) to a CW detector circuit, a first portion of the portion of the CW optical signal and (q) to a CCW detector circuit, a first portion of the portion of the CCW optical signal, and (c) optically couple, to a beat detector circuit, a second portion of the portion of the CW optical signal and a second portion of the portion of the CCW optical signal; the CW detector circuit configured to provide a CW control signal to the optical source; the CCW detector circuit configured to provide a CCW control signal to the optical source; wherein the optical source is further configured to use the CW control signal to adjust a carrier frequency of the CW optical signal to equal to a resonant frequency of the travelling wave resonator in a CW direction and use the CCW control signal to adjust a carrier frequency of the CCW optical signal to equal a resonant frequency of the travelling wave resonator in a CCW direction; and the beat detector circuit configured to determine a rate of rotation of the resonator optical gyroscope around the rotation axis based upon a difference of a carrier frequency of the second portion of the CW optical signal and a carrier frequency of the second portion of the CCW optical signal.

Example 9 includes the resonator optical gyroscope of Example 8, wherein the TM mode is a TM0 mode.

Example 10 includes the resonator optical gyroscope of any of Examples 8-9, wherein the TE mode is a TE0 mode.

Example 11 includes the resonator optical gyroscope of any of Examples 8-10, wherein the core comprises silicon nitride and the cladding comprises silicon dioxide.

Example 12 includes the resonator optical gyroscope of any of Examples 8-11, wherein travelling wave resonator is one of a ring resonator, a disc resonator, and a racetrack resonator.

Example 13 includes the resonator optical gyroscope of any of Examples 8-12, wherein the core has a width that is less than seven free space wavelengths of the optical signal configured to be propagated in the planar optical waveguide, wherein the width means a dimension along another axis substantially perpendicular to the axis of the thickness and parallel with a surface of the substrate.

Example 14 includes the resonator optical gyroscope of Example 13, wherein the width is a diameter of the travelling wave resonator which is a disc resonator.

Example 15 includes the resonator optical gyroscope of any of Examples 8-14, wherein the rate of rotation is: $\Omega=(\Delta f*n*\lambda)/D$, where D is a diameter of the travelling wave resonator, $\lambda$ is an average wavelength of the CW optical signal and the CCW optical signal, and n is a refractive index of the cladding; wherein the travelling wave resonator is one of a disc resonator and a ring resonator.

Example 16 includes a method of operation of a resonant optical gyroscope comprising travelling wave resonator configured to be mounted over a surface of a substrate, the method comprising: receiving, a clockwise (CW) optical signal at the travelling wave resonator and propagating the CW optical signal in a transverse magnetic mode clockwise around the travelling wave resonator, wherein the travelling wave resonator is configured to propagates electromagnetic energy in only one direction, and wherein the travelling wave resonator comprises: planar optical waveguide comprising: a core having a core index of refraction and a thickness which is at least ten percent of a free space wavelength of an optical signal configured to be propagated by such planar optical waveguide, wherein the thickness means a dimension along an axis perpendicular to the surface of the substrate; and cladding having a cladding index of refraction and surrounding the core and over the substrate; wherein the cladding index of refraction is smaller than the core index of refraction; at least one sidewall of the cladding, wherein a sidewall means a surface, of the cladding, perpendicular to the substrate; at least one Bragg grating, wherein each Bragg grating is in a unique sidewall; and a rotation axis around which the resonant optical gyroscope is configured to be rotated; wherein a period of each Bragg grating period is greater than the free space wavelength of the optical signal configured to propagate in the travelling wave resonator divided by two times an index of refraction of a transverse electric (TE) mode; wherein the period of a Bragg grating is less than the free space wavelength of the optical signal configured to propagate in the travelling wave resonator divided by two times an index of refraction of a transverse magnetic (TM) mode; receiving, a counterclockwise (CCW) optical signal at the travelling wave resonator and propagating the CCW optical signal in the TM mode counterclockwise around the travelling wave resonator; extracting, from the travelling wave resonator, at least one portion of the CW optical signal propagating clockwise around the travelling wave resonator; extracting, from the travelling wave resonator, at least one portion of the CCW optical signal propagating counterclockwise around the travelling wave resonator; using the at least one portion of the CW optical signal, adjusting a carrier frequency of the CW optical signal, received at the travelling wave resonator, to equal a CW resonant frequency of the travelling wave resonator; using the at least one portion of the CCW optical signal, adjusting a carrier frequency of the CCW optical signal, received at the travelling wave resonator, to equal a CCW resonant frequency of the travelling wave resonator; and using a carrier frequency of the at least one portion of the CW optical signal and a carrier frequency of the at least one portion of the CCW optical signal, determining a rate of rotation around the rotation axis of the travelling wave resonator.

Example 17 includes the method of Example 16, wherein the TM mode is a TM0 mode.

Example 18 includes the method of any of Examples 16-17, wherein the TE mode is a TE0 mode.

Example 19 includes the method of any of Examples 16-18, wherein the rate of rotation is: $\Omega=(\Delta f*n*\lambda)/D$, where D is a diameter of the travelling wave resonator, $\lambda$ is an average wavelength of the CW optical signal and the CCW optical signal, and n is a refractive index of the cladding; wherein the travelling wave resonator is one of a disc resonator and a ring resonator.

Example 20 includes the method of any of Examples 16-19, wherein the core has a width that is less than free space wavelengths of the optical signal configured to be propagated in the travelling wave resonator, wherein the width means a dimension along another axis substantially perpendicular to the axis of the thickness and parallel with a surface of the substrate.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator configured to be mounted over a surface of a substrate, comprising:
   a planar optical waveguide comprising:
      a core having a core index of refraction and a thickness which is at least ten percent of a free space wavelength of an optical signal configured to be propagated by such planar optical waveguide, wherein the thickness means a dimension along an axis perpendicular to the surface, of the substrate, under the resonator; and
      a cladding having a cladding index of refraction and surrounding the core and over the surface of the substrate;
   wherein the cladding index of refraction is smaller than the core index of refraction;
   at least one sidewall of the cladding, wherein a sidewall means a surface, of the cladding, perpendicular to the surface of the substrate; and
   at least one Bragg grating, wherein each Bragg grating is in a unique sidewall of the cladding;
   wherein a Bragg grating period is greater than the free space wavelength of the optical signal configured to propagate in the planar optical waveguide divided by two times an index of refraction of a transverse electric zero (TE0) mode;
   wherein the Bragg grating period is less than the free space wavelength of the optical signal configured to propagate in the planar optical waveguide divided by two times an index of refraction of a transverse magnetic zero (TM0) mode;
   wherein the resonator is a travelling wave resonator configured to propagate electromagnetic energy in only one direction.

2. The resonator of claim 1, wherein the core comprises silicon nitride and the cladding comprises silicon dioxide.

3. The resonator of claim 1, wherein the travelling wave resonator is one of a ring resonator, a disc resonator, and a racetrack resonator.

4. The resonator of claim 1, wherein the core has a width that is less than seven free space wavelengths of the optical signal configured to be propagated in the planar optical waveguide, wherein the width means a dimension along another axis substantially perpendicular to the axis of the thickness and parallel with the surface of the substrate.

5. The resonator of claim 4, wherein the width is a diameter of the core when the resonator is a disc resonator.

6. A resonator optical gyroscope, comprising:
   a travelling wave resonator configured to be mounted over a surface of a substrate, wherein the travelling wave resonator is configured to propagate electromagnetic energy in only one direction;
   the travelling wave resonator comprising:
      a planar optical waveguide comprising:
         a core having a core index of refraction and a thickness which is at least ten percent of a free space wavelength of an optical signal configured to be propagated in such planar optical waveguide, wherein the thickness means a dimension along an axis perpendicular to the surface of the substrate; and
         a cladding having a cladding index of refraction and surrounding the core and over the surface of the substrate;
      wherein the cladding index of refraction is smaller than the core index of refraction;
      at least one sidewall of the cladding, wherein a sidewall means a surface, of the cladding, perpendicular to the surface of the substrate;
      at least one Bragg grating, wherein each Bragg grating is in a unique sidewall of the cladding; and
      a rotation axis around which the resonator optical gyroscope is configured to be rotated;
      wherein a Bragg grating period is greater than the free space wavelength of the optical signal configured to propagate in the planar optical waveguide divided by two times an index of refraction of a transverse electric zero (TE0) mode;
      wherein the Bragg grating period is less than the free space wavelength of the optical signal configured to propagate in the planar optical waveguide divided by two times an index of refraction of a transverse magnetic zero (TM0) mode;
   an optical source, comprising at least one laser, configured to emit a clockwise (CW) optical signal and a counterclockwise (CCW) optical signal;
   at least one optical coupler configured to (a) optically couple, to the travelling wave resonator, (i) a portion of the CW optical signal configured to propagate CW around the travelling wave resonator and (ii) a portion of the CCW optical signal configured to propagate CW around the travelling wave resonator, (b) optically couple, (p) to a CW detector circuit, a first portion of the portion of the CW optical signal and (q) to a CCW detector circuit, a first portion of the portion of the CCW optical signal, and (c) optically couple, to a beat detector circuit, a second portion of the portion of the CW optical signal and a second portion of the portion of the CCW optical signal;
   the CW detector circuit configured to provide a CW control signal to the optical source;
   the CCW detector circuit configured to provide a CCW control signal to the optical source;
   wherein the optical source is further configured to use the CW control signal to adjust a carrier frequency of the CW optical signal to equal a resonant frequency of the travelling wave resonator in a CW direction and use the CCW control signal to adjust a carrier frequency of the CCW optical signal to equal a resonant frequency of the travelling wave resonator in a CCW direction; and
   the beat detector circuit is configured to determine a rate of rotation of the resonator optical gyroscope around the rotation axis based upon a difference of a carrier frequency of the second portion of the CW optical signal and a carrier frequency of the second portion of the CCW optical signal.

7. The resonator optical gyroscope of claim 6, wherein the core comprises silicon nitride and the cladding comprises silicon dioxide.

8. The resonator optical gyroscope of claim 6, wherein the travelling wave resonator is one of a ring resonator, a disc resonator, and a racetrack resonator.

9. The resonator optical gyroscope of claim 6, wherein the core has a width that is less than seven free space wavelengths of the optical signal configured to be propagated in the planar optical waveguide, wherein the width means a dimension along another axis substantially perpendicular to the axis of the thickness and parallel with the surface of the substrate.

10. The resonator optical gyroscope of claim 9, wherein the width is a diameter of the travelling wave resonator which is a disc resonator.

11. The resonator optical gyroscope of claim 6, wherein the rate of rotation is:

$$\Omega = (\Delta f \cdot n \cdot \lambda)/D,$$

where $\Delta f$ is a difference of a carrier frequency of the CW optical signal and a carrier frequency of the CCW optical signal, D is a diameter of the travelling wave resonator, $\lambda$ is an average wavelength of the CW optical signal and the CCW optical signal, and n is a refractive index of the cladding;
wherein the travelling wave resonator is one of a disc resonator and a ring resonator.

12. A method of operation of a resonant optical gyroscope comprising travelling wave resonator configured to be mounted over a surface of a substrate, the method comprising:
receiving a clockwise (CW) optical signal at the travelling wave resonator and propagating the CW optical signal in a transverse magnetic mode clockwise around the travelling wave resonator, wherein the travelling wave resonator is configured to propagates electromagnetic energy in only one direction, and wherein the travelling wave resonator comprises:
a planar optical waveguide comprising:
a core having a core index of refraction and a thickness which is at least ten percent of a free space wavelength of an optical signal configured to be propagated by such planar optical waveguide, wherein the thickness means a dimension along an axis perpendicular to the surface of the substrate; and
a cladding having a cladding index of refraction and surrounding the core and over the substrate;
wherein the cladding index of refraction is smaller than the core index of refraction;
at least one sidewall of the cladding, wherein a sidewall means a surface, of the cladding, perpendicular to the substrate;
at least one Bragg grating, wherein each Bragg grating is in a unique sidewall; and
a rotation axis around which the resonant optical gyroscope is configured to be rotated;
wherein a period of a Bragg grating period is greater than the free space wavelength of the optical signal configured to propagate in the travelling wave resonator divided by two times an index of refraction of a transverse electric zero (TE0) mode;
wherein the period of a Bragg grating period is less than the free space wavelength of the optical signal configured to propagate in the travelling wave resonator divided by two times an index of refraction of a transverse magnetic zero (TM0) mode;
receiving a counterclockwise (CCW) optical signal at the travelling wave resonator and propagating the CCW optical signal in the TM mode counterclockwise around the travelling wave resonator;
extracting, from the travelling wave resonator, at least one portion of the CW optical signal propagating clockwise around the travelling wave resonator;
extracting, from the travelling wave resonator, at least one portion of the CCW optical signal propagating counterclockwise around the travelling wave resonator;
using the at least one portion of the CW optical signal, adjusting a carrier frequency of the CW optical signal, received at the travelling wave resonator, to equal a CW resonant frequency of the travelling wave resonator;
using the at least one portion of the CCW optical signal, adjusting a carrier frequency of the CCW optical signal, received at the travelling wave resonator, to equal a CCW resonant frequency of the travelling wave resonator; and
using a carrier frequency of the at least one portion of the CW optical signal and a carrier frequency of the at least one portion of the CCW optical signal, determining a rate of rotation around the rotation axis of the travelling wave resonator.

13. The method of claim 12, wherein the rate of rotation is:

$$\Omega = (\Delta f \cdot n \cdot \lambda)/D,$$

where $\Delta f$ is a difference of a carrier frequency of the CW optical signal and a carrier frequency of the CCW optical signal, D is a diameter of the travelling wave resonator, $\lambda$ is an average wavelength of the CW optical signal and the CCW optical signal, and n is a refractive index of the cladding;
wherein the travelling wave resonator is one of a disc resonator and a ring resonator.

14. The method of claim 12, wherein the core has a width that is less than seven free space wavelengths of the optical signal configured to be propagated in the travelling wave resonator, wherein the width means a dimension along another axis substantially perpendicular to the axis of the thickness and parallel with the surface of the substrate.

* * * * *